J. H. PIERCE.
HYDROPLANE.
APPLICATION FILED NOV. 17, 1910.
1,014,514.
Patented Jan. 9, 1912.
4 SHEETS—SHEET 1.
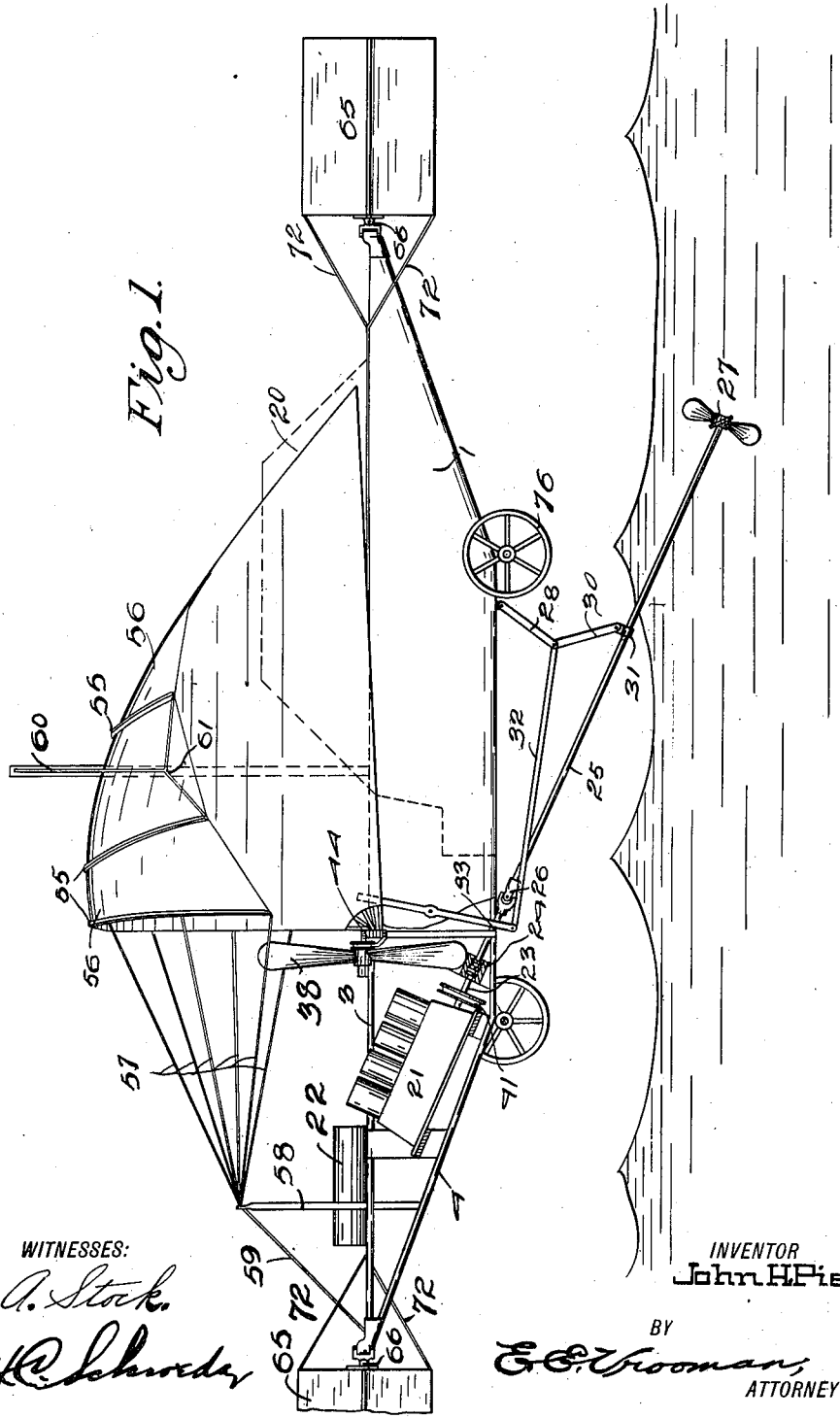
WITNESSES:
INVENTOR
John H Pierce
BY
ATTORNEY.

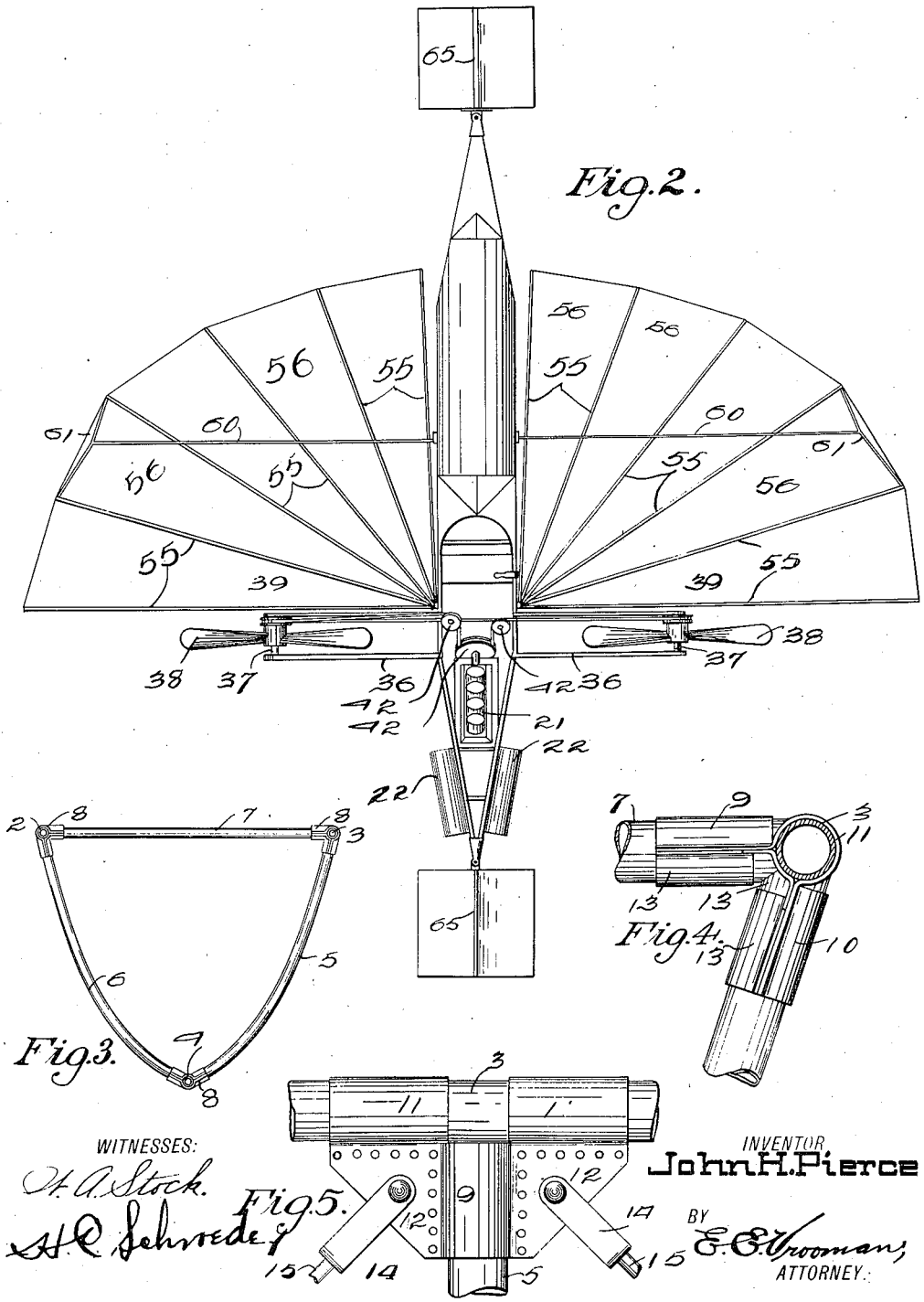

J. H. PIERCE.
HYDROPLANE.
APPLICATION FILED NOV. 17, 1910.

1,014,514.

Patented Jan. 9, 1912.

4 SHEETS—SHEET 3.

WITNESSES:
H. A. Stock
H. C. Schroeder

INVENTOR
John H. Pierce.

BY
E. E. Vrooman,
ATTORNEY.

J. H. PIERCE.
HYDROPLANE.
APPLICATION FILED NOV. 17, 1910.
1,014,514.
Patented Jan. 9, 1912.
4 SHEETS—SHEET 4.
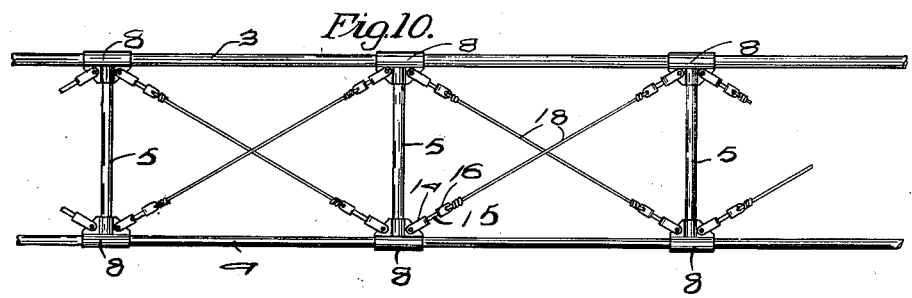
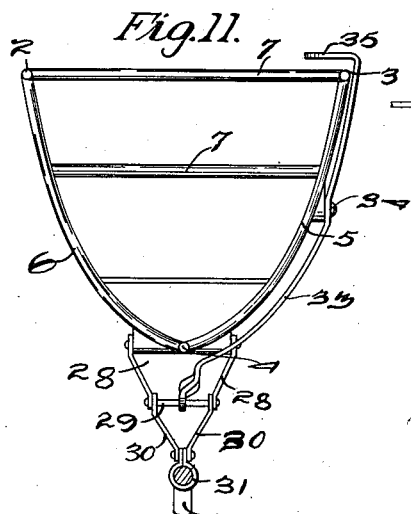
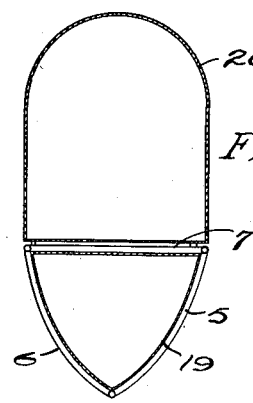
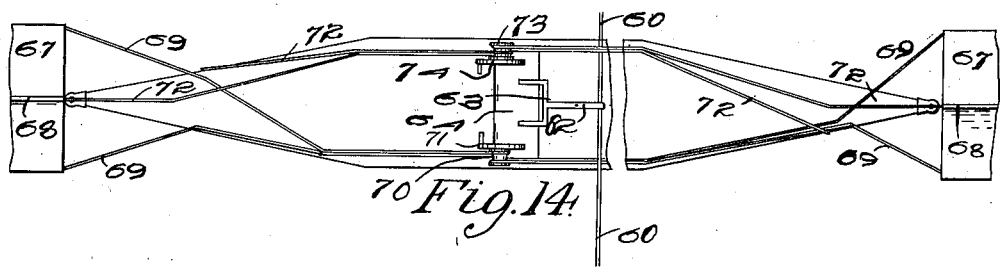
WITNESSES:
A. A. Stock
H. Schroder
INVENTOR
John H Pierce
BY
E. E. Vrooman
ATTORNEY.

UNITED STATES PATENT OFFICE.

JOHN H. PIERCE, OF OAKLAND, CALIFORNIA.

HYDROPLANE.

1,014,514.  Specification of Letters Patent.  Patented Jan. 9, 1912.

Application filed November 17, 1910. Serial No. 592,898.

*To all whom it may concern:*

Be it known that I, JOHN H. PIERCE, a citizen of the United States, residing at Oakland, in the county of Alameda and State of California, have invented certain new and useful Improvements in Hydroplanes, of which the following is a specification.

This invention relates to flying machines of the heavier than air type and the principal object of the same is to produce a machine which can be operated either on land or in the air, or in the water, but which preferably is operated partly in the air and partly in the water.

Another object of the device is to produce an improved mechanism for raising and lowering the propeller which enters the water.

A still further object of the invention is to produce an improved type of supporting wings, which can be adjusted so as to better assist in balancing the machine.

This invention is illustrated in the accompanying drawings, wherein:—

Figure 6:
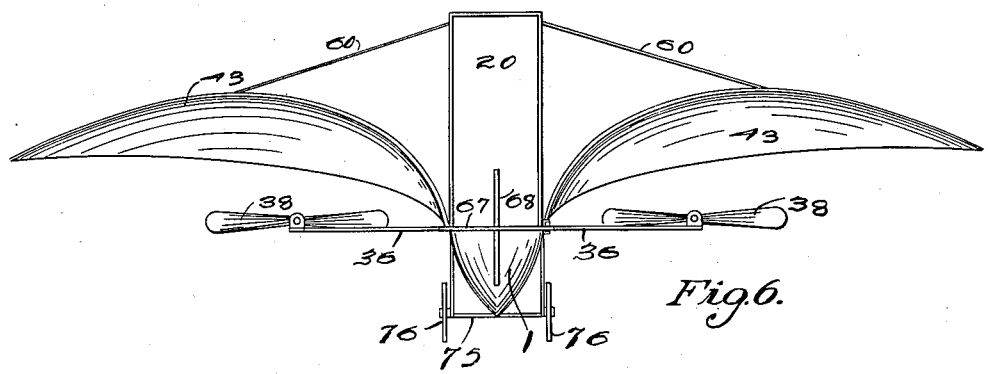
Figure 7A:
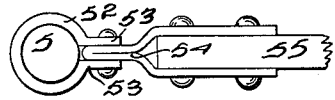
Figure 7:
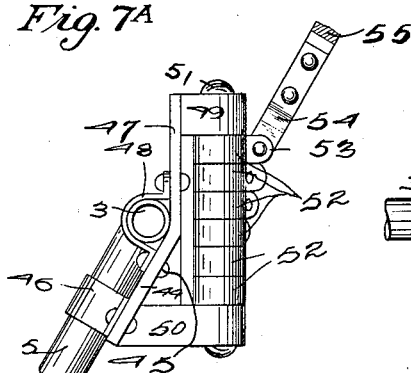
Figure 8:
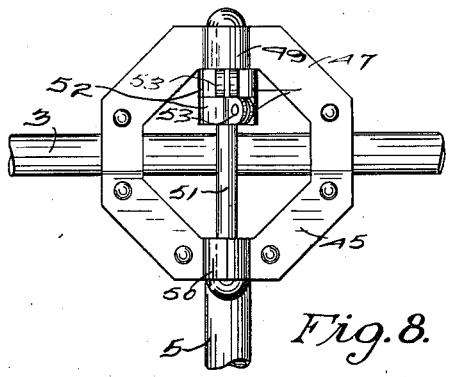
Figure 9:
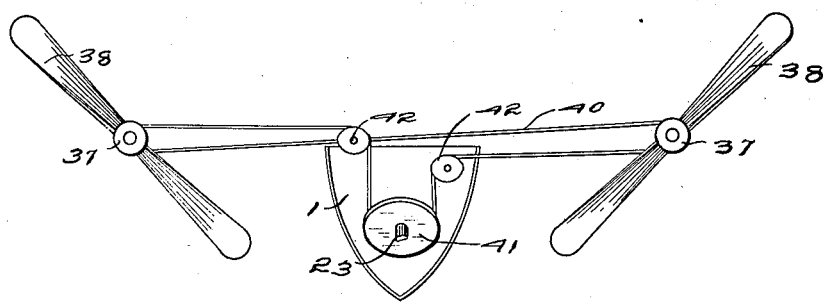

Figure 1 is a view of the machine as it would appear when flying in the preferred manner. Fig. 2 is a top plan view of the machine. Fig. 3 is a view showing the manner of constructing the body portion. Fig. 4 is an enlarged view of the rods used in constructing the body and shows the clamps for holding the rods together. Fig. 5 is a top view of Fig. 4. Fig. 6 is a view in front elevation of the machine. Fig. 7 is an enlarged view showing the method of mounting the wings. Fig. 7ª is an enlarged view of the collars for attaching the ribs to the wings. Fig. 8 is a face view of the bracket used for attaching the wings some of the collars being removed. Fig. 9 is a view of the means for operating the air propellers. Fig. 10 is a side view of the manner of constructing the body frame. Fig. 11 is a view showing the manner of mounting the lever for controlling the water propeller. Fig. 12 is an enlarged view of the couplings for securing the guy ropes. Fig. 13 is a view showing the water tight compartment within the body and the compartments containing the gas bags. Fig. 14 is a plan view of the means for operating the guiding rudders.

Referring to the accompanying drawings by numerals it will be seen that the improved device comprises a body portion 1 which is substantially boat shaped, the construction of which comprises three longitudinal rods 2, 3 and 4 which are arranged so that the rod 4 forms the center of the boat and the rod 4 forms the center of the boat and the rods 2 and 3 form the side rods. The rods are connected by means of a number of ribs 5 and 6 and cross bars 7. The ribs and bars are connected with the rods by means of the couplings 8. The couplings are formed from sheet metal and are provided with semi-circular portions 9 and 10 and with a pair of arcuate portions 11. The flat portions 12 to each side of the semi-circular portions are each provided with a series of openings which are located adjacent the rods when the plates are placed in position. Curved plates 13 partly surround the rods and are secured to the portions 12 by means of bolts which pass through the openings formed in the portions 12 thus securely holding the frame together. Substantially U-shaped clips 14 are pivotally mounted upon each of the portions 12 and have attached thereto bolts 15. A similar U-shaped clip 16 is mounted upon each bolt and held in place by means of the nut 17. The clips 16 are joined by diagonal guy rods 18 which are tightened by turning the nuts 17. The frame thus constructed is pointed toward each end and is covered with suitable walls 19 to make a water tight body portion which will enable the machine to float upon the water and not sink. A casing 20 is mounted upon the body portion and is adapted to contain gas bags which help hold the machine in the air although the machine does not depend upon these gas bags for its sustaining power and could be operated without them.

An engine 21 of any desired make is mounted near the forward portion of the body and is fed from supply tanks 22 carried by the body. The engine is positioned with its rear end at a lower angle than the forward end and has a power shaft 23 which is supported by a bearing 24 and which projects through the body portion. A propeller shaft 25 is connected to the power shaft by means of the universal joint 26 and has a propeller 27 fixed on its end. The propeller shaft 25 is supported by means of a toggle frame which comprises a pair of upper links 28, which are pivotally mounted upon the body and have their ends connected by a bolt 29 upon which there is mounted the lower links 30. The ends of the links 30 are attached to a sleeve 31 in which the propeller shaft is rotatably mounted. A rod 32 is mounted upon the bolt 29 and is brought toward the forward end of the car where it is pivotally mounted upon an operating lever 33 which is pivotally mounted upon the side of the body at the point 34, and has its upper end 35 bent inwardly over the body portion to form a hand grip.
A rod 36 extends to each side of the forward portion of the body and has journaled at its outer ends axles 37 upon which there are mounted aerial propellers 38, the hubs of which are provided with groove pulleys
39. A driving belt 40 is passed around a groove pulley 41 mounted upon the power shaft 23 and carried over idler pulleys 42, and outwardly and around the pulleys 39 to revolve the aerial blades.
A pair of wings 43 is mounted upon the body portion being connected to the rods 2 and 3 and the ribs 5 and 6 by means of brackets 44. Each bracket is preferably octagonal and has its lower portion 45 secured to the rib by means of the collar 46. The upper portion 47 is bent at an upward angle to the lower portion 45, and is secured to the side rods by means of the collars 48 so that the bracket is securely held in place, the upper portion extending above the side rods. The bracket is provided with a hinge ear 49 centrally located upon the upper portion and a longer hinge ear 50 centrally located upon the lower portion, the two ears being provided with openings which are in alinement. A bolt 51 is passed through the alined openings of the two ears and has rotatably mounted upon its intermediate portion a number of open rings 52, which are provided with pivot ears 53. A hinge plate 54 is bent intermediate its length and pivotally mounted between the hinge ears 53 and has its outer arms spaced apart to accommodate the end of the wing ribs 55.
The wing ribs 55 are upwardly and outwardly curved to form a pair of wings which are practically the shape of birds' wings extended and have secured to their under surfaces a connecting web 56 which is formed of silk or other suitable material. The forward ones of the ribs 55 are braced by guy ropes 57 which have their ends secured to a vertical pole 58 which is suitably braced by a rod 59 which is secured to the front end of the body. The wings in the normal position are in the positions shown in Figs. 1, 2 and 6, the forward edge being just to the rear of the aerial propellers 38. These wings when in a normal position form sort of a cornucopia so that the air caused by the propellers enters the larger end and passes out through the smaller rear end, thus causing the wings to have a greater sustaining power. The wings normally have a downward curve but are controlled by means of braces 60 to which they are secured to the points 61 and the braces are connected to a lever 62 which is pivotally mounted and provided with a fork end 63 which is positioned above the operator's seat 64, that the wings may be raised and lowered by simply swaying the body to one side or the other. This construction would be very convenient when making the turns.

Rudders 65 are secured to the forward and rear ends of the machine by means of universal joints 66. Each rudder comprises a pair of planes 67 and 68, which are placed at right-angles to each other, the planes 67 being horizontal and the planes 68 being vertical. An operating rope 69 is secured to the corners of each of the planes 67 and is brought within the car and mounted upon a winding drum 70 which is provided with an operating wheel 71. One rope 69 on each forward and rear rudder is wound upon the drum in an opposite direction to the second rope 69 so that when the wheel 71 is rotated one of the ropes attached to each of the planes 67 will be tightened and the other rope loosened. By this construction the planes move together and the machine is thus guided to either the right or left according to the direction in which the wheel 71 is turned. The ropes 72 which are attached to the planes 68 are mounted upon the winding drum 73 in a similar manner to the ropes 69, so that the rudders will be adjusted vertically the opposite directions to each other and the machine will thus be caused to rise up or go down according to the direction the wheel 74 is turned.

The body portion is provided with a depending frame work 75 near each end upon which there is mounted the wheels 76, upon which the machine is supported when running on land. By means of this construction the machine can descend from the air and light upon the ground without any undue jolt as the machine will light upon the wheels and roll forward a short distance before stopping.

In the operation of this device it is intended that it should be used as illustrated in Fig. 1. In this form the engine is started and the aerial propellers revolved which elevate the machine, and propel it forward. The lever 33 is pushed forward which moves the shaft 32 toward the rear and brings the propeller shaft 25 downwardly, so that the propeller blade 27 enters the water and the machine is thus propelled not only by the aerial propeller, but also by the water propeller 27. If desired the machine can be lowered to the surface of the water, and the aerial propellers disconnected from the motor. The lever 33 is then rocked rearwardly which moves the rod shaft 32 forwardly, and rocks the toggle bracket to raise the water propeller, so that the same will be brought closer to the body of the machine and will not be sunk too deep into the water. If it is desired to go higher in the air, the water propeller is raised by the means already described and the rudders moved vertically to cause the machine to rise into the air. When the machine is in the air the gas bags held within the compartments 20 help to sustain the weight of the device. The machine does not depend upon these gas bags to sustain its weight as the wings 43 are amply sufficient to support the machine and if anything should happen to stop the motor the machine would gradually float to the earth as a bird does when preparing to alight. If it is desired to descend more rapidly, the braces 60 can be moved to raise the outer ends of the wings to permit a more rapid descent. When making turns in the air the lever 63 is turned in the proper direction to raise one wing and lower the other to keep the machine properly balanced.

When it is desired to run this machine on the land, the guy ropes 57 are detached from the pole 58 and the wings are folded back upon the body of the machine and securely fastened into place. The water propeller is raised and the lever securely locked so that there is no danger of the propeller blade 27 dragging upon the ground, and the motor started to rotate the aerial propellers. These propellers move the machine forward and the machine is guided by turning the rudders in the proper direction.

What I claim is:—

1. In a flying machine, a body portion, aerial propellers, a water propeller, a toggle bracket mounted upon said body portion, said toggle bracket comprising a pair of upper side bars, a bolt connecting the lower end of said bars, a pair of lower side bars mounted upon said bolt, a sleeve slidably mounted upon said water propeller shaft and pivotally mounted between said lower side bars, a rod mounted upon said bolt, an operating lever pivotally connected with said rod, and body portion and adapted to move said rod to vertically adjust said water propeller, and operating means for said propellers.

2. In a flying machine a body portion, a motor carried by said body portion, a propeller shaft connected with the shaft of said motor, a sleeve slidably mounted upon said propeller shaft, a toggle-bracket mounted at one end to said body portion and at the other end connected with said sleeve, a rod connected to the pivot bar of said toggle-bracket, and means for moving said rod to open and close said toggle-bracket to raise and lower said propeller shaft.

In testimony whereof I affix my signature in presence of two witnesses.

JOHN H. PIERCE.

Witnesses:
H. C. SCHROEDER,
E. G. GRAY.